Dec. 14, 1943. R. R. ROCKHILL Re. 22,406

ROTARY DUPLICATOR

Original Filed May 5, 1939 3 Sheets-Sheet 1

Inventor
R. R. Rockhill

By

Attorneys

Dec. 14, 1943. R. R. ROCKHILL Re. 22,406

ROTARY DUPLICATOR

Original Filed May 5, 1939 3 Sheets-Sheet 2

Inventor
R.R.Rockhill

By Young & Young

Attorneys

Dec. 14, 1943. R. R. ROCKHILL Re. 22,406

ROTARY DUPLICATOR

Original Filed May 5, 1939 3 Sheets-Sheet 3

Inventor
R.R. Rockhill

By

Attorneys

Reissued Dec. 14, 1943 Re. 22,406

UNITED STATES PATENT OFFICE 22,406

ROTARY DUPLICATOR

Roscoe R. Rockhill, Shorewood, Wis., assignor to Rex-O-Graph, Inc., Milwaukee, Wis., a corporation of Wisconsin Original No. 2,271,954, dated February 3, 1942, Serial No. 271,971, May 5, 1939. Application for reissue August 5, 1942, Serial No. 453,759

8 Claims. (Cl. 101—132.5)

This invention pertains to duplicating machines of the liquid or spirit type, in which a moistened work sheet is passed over a cylinder containing a master copy made by typing the same against a hectograph sheet.

The invention has primarily for its object to simplify and improve machines of the foregoing type, particularly with respect to proper uniform application of moisture to the work sheet, correct registration of the sheets with the master copy, and automatic feed of the work sheets from a stack.

Incidental to the foregoing a more specific object of the invention is to provide a moistening mechanism of the roller type, including a pressure feed roll for forcing the work sheets against a moistening roll partially submerged in liquid, said pressure feed roll being intermittently rotated when in contact with the work sheet only, to prevent moisture from being transferred to the pressure feed roll to produce an extra heavy copy at the beginning of the sheet.

Another object resides in elimination of wicks and the provision of a roller moistening mechanism in which liquid is uniformly applied to the moistening roll throughout its length.

Another object is to provide means for creating transverse spreading tension upon the work sheets as they pass over the moistening roll, to prevent wrinkles forming in the sheet.

Another object resides in the provision of an exceedingly simple and positive automatic sheet feed mechanism, capable of feeding sheets of wide variation in length and width from a stack.

A still further object is the provision of a mechanism for quickly centering stacks of work sheets of various dimensions, for uniform accurate register with the master copy.

With the above and other objects in view, which will appear as the description proceeds, the invention resides in the novel construction, combination, and arrangement of parts substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 1:
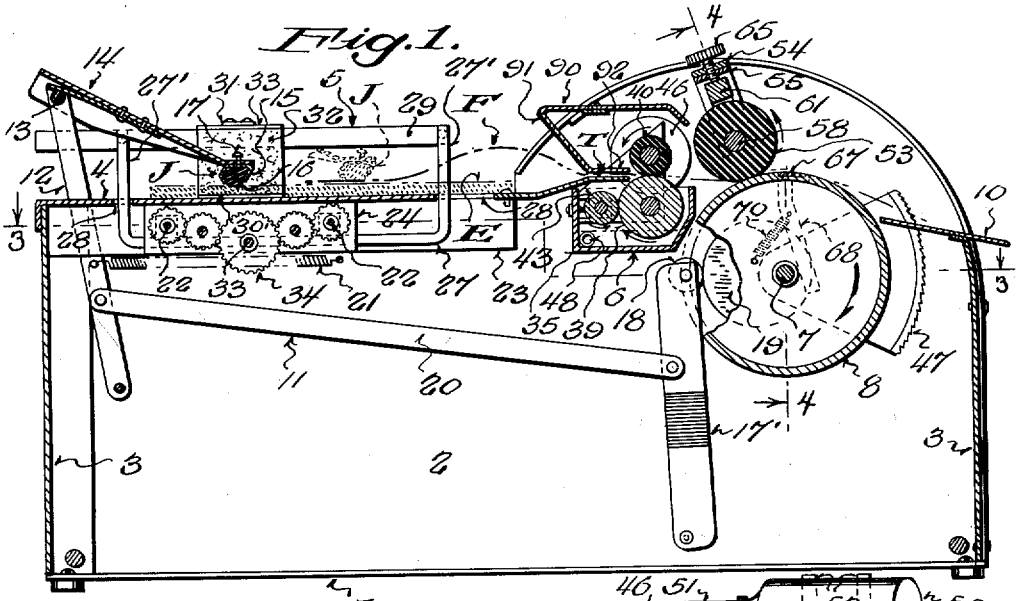
Figure 1 is a longitudinal section through a duplicating machine incorporating the principles of the present invention, the same being taken on the line 1—1 of Figure 2.

Referring now more particularly to the accompanying drawings, the numeral 1 designates generally a casing or frame comprising side and end walls 2 and 3 respectively, upon which a stack supporting table 4 is mounted adjacent the forward end of the machine. Carried by the table is a stack centering and holding mechanism 5, while adjacent the rear end of the table, is a moistening mechanism 6, mounted between the side walls 2, for receiving work sheets from the stack supported on the table.

Journaled in the side walls 2, rearwardly of the moistening mechanism 6, is a transverse shaft 7, upon which a cylinder 8 is secured, that carries the master copy C, as hereinafter explained. The cylinder 8 may be rotated by a crank handle 9 secured to one end of the shaft 7, exteriorly of the casing, or by any suitable power means, such as an electric motor. An inclined plate 10 secured to the top of the rear wall 3, and terminating closely adjacent the cylinder 8, serves to deliver the finished work sheets from the machine as they are discharged from the cylinder.

For automatically feeding sheets from the stack contained on the table 4 to the moistening mechanism 6, a feed 11 is provided, and actuated in timed relation to the operation of both the moistening mechanism 6 and the master cylinder 8.

Considering now in detail the several operative units heretofore generally referred to, in their order of operation, for centering and frictionally holding the stack E on the table 4, the mechanism 5 comprises a pair of oppositely threaded spaced worms 22, journaled in side brackets 23 carried by the table 4 and an intermediate bracket 24 also secured to the bottom of the table. The worms 22 are each provided with right and left hand threads extending in opposite directions from the center bracket 24, and mounted upon each side of the worms is a pair of alined nuts 26, to which a U shaped bar 27 is secured, the ends of the bars extending upwardly through transverse openings 28 formed in the table.

Figure 7:
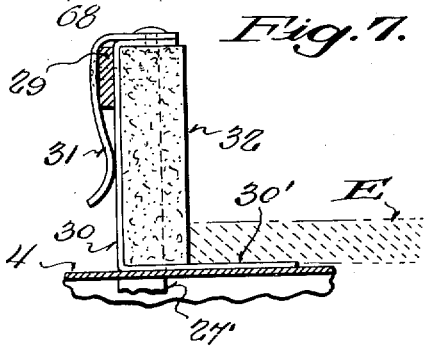
Figure 7 is an enlarged fragmentary section of a portion of the stack centering and holding mechanism, the same being taken on the line 7—7 of Figure 2.

The upturned ends of the bars 27 carry straps 29, upon which brackets 30 are slidably mounted, the brackets being frictionally held upon the bars by means of spring clips 31 as best shown in Figure 7. Suitably secured in the brackets are friction pads 32 formed of sponge rubber or other suitable material, for frictionally engaging the edges of the stack E which is supported adjacent its edges upon the feet 30' formed on the lower end of the brackets.

In as much as the pads 32 are spaced an equal distance from the longitudinal axis of the table, rotation of the screws will obviously cause them to be simultaneously and uniformly moved toward or away from the longitudinal axis of the table. This operation is accomplished by means of a crank handle 33 journaled in one of the side brackets 23 and the central bracket 24, and operatively connected with the screw shafts 22 through a gear train 34.

The feed mechanism 11 comprises a pair of arms 12 pivoted at their lower ends to the inner faces of the side walls 2 of the casing, and projecting upwardly adjacent the sides of the table 4, a substantial distance above the same. The arms 12 are connected at their upper ends by a transverse bar 13, upon which a feed arm 14 is pivotally mounted adjacent its forward end, the arm extending downwardly and rearwardly to engage the top work sheet F of the stack E supported upon the table 4 as indicated in dotted lines in Figure 1. The lower end of the arm 14 is provided with a foot J comprising a restricted channel member 15, which clamps a strip of pliable material 16, such as rubber, composition, felt or other suitable material presenting a soft surface for frictionally engaging the work sheets.

As will be noted in Figure 1, the lower face of the strip 16 is slightly rounded, while the channel 15 is loosely connected to the end of the arm 14 by headed studs 17, which allow the foot to rock slightly with relation to the arm 14, to increase frictional contact between the foot and work sheets upon the forward feeding movement of the arm, and relieve the same upon return travel.

Reciprocation of the arm 14 is accomplished by means of a lever 17', pivotally connected to one of the side walls 2, and provided at its upper end with a knurled roller 18, which operates against an eccentric fiber cam 19 secured upon the shaft 7, that carries the master cylinder 8. It is preferred to knurl the surface of the roller 18, which engages the fiber disc 19, in as much as it insures continuous rotation of the roller, which might otherwise stick and cause a flat in the surface of the eccentric 19, thus effecting accuracy of the feed mechanism 11.

A link 20 connecting the lever 17' with one of the arms 12, imparts movement to the arm and, consequently, to the transverse bar 13, which carries the feed arm 14. The lever 17' is held against the cam 19 by a contractile spring 21, connected to one of the arms 12 and the casing.

Positioned above the moistener 6, to protect the same against dirt and accidental insertion of the operator's hand is a hood 90 secured to the side walls 2, and provided with a depending inclined side wall 91 terminating in a lip 92, parallel to the rear of the table 4, and forming a restricted throat T for receiving and directing the work sheets to the moistener.

Figure 2:
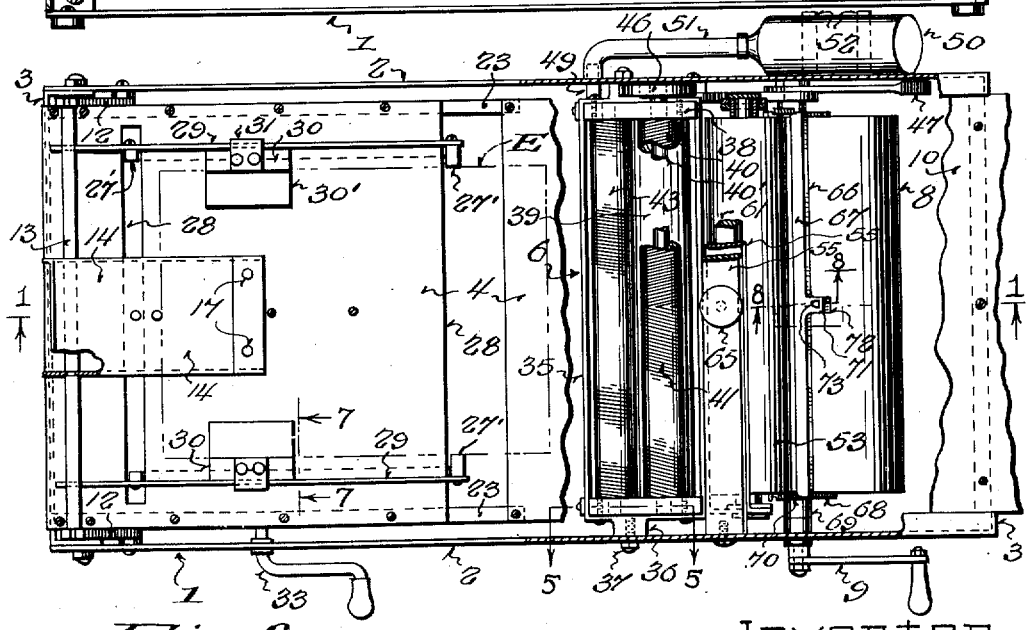
Figure 2 is a plan view of the machine with parts broken away and in section to more clearly illustrate structural details.

The moistening mechanism comprises a liquid trough 35, the ends of which are provided with bosses 36 secured to the side walls 2 by cap screws 37. Secured to the inner faces of the ends of the trough 35 are brackets 38, in which a moistening roll 39 is journaled. Above the moistened roll, a pressure feed roll 40 is also journaled in the brackets 38, and is formed of yieldable material such as rubber, composition or the like to maintain pressure upon the moistening roll. As best shown in Figure 2, it is also preferred to provide the surface of the roll 40 with oppositely extending threads 41. The function of these threads is to create a slight spreading tension upon the work sheet to prevent any possibility of wrinkling as the same passes through the moistener, thus insuring a smooth sheet and even copy.

Figure 5:
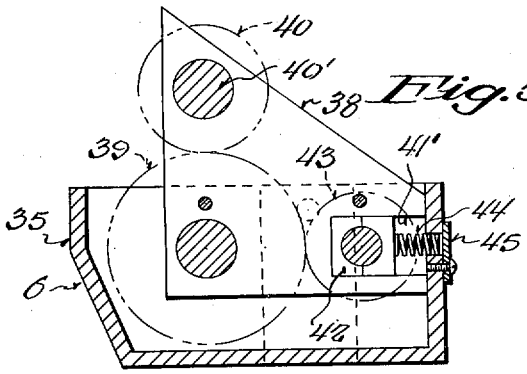
Figure 5 is a detail section of the moistening mechanism taken on the line 5—5 of Figure 2.

As best shown in Figure 5, the brackets 38 are provided with longitudinal slots 41' for reception of slidable blocks 42, in which the squeegee roll 43 is journaled. The roll 43 is yieldably held in contact with the moistening roll 39 by an expansible coil spring 44 interposed between the blocks and plates 45 secured to one of the side walls of the trough 35, the plates 45 being detachable to facilitate replacement of the springs, without dismantling the entire moistening mechanism.

In addition to removing excess liquid from the moistening roll 39, the face of the squeegee roll 43 is preferably provided with a fine thread, which upon rotation of the roll serves to distribute the liquid longitudinally on the moistening roll, thus insuring a uniform coating throughout the entire length of the roll.

As will be later described, the pressure feed roller is driven at intervals, by means of a fiber or composition roller 46 secured to the protruding end of the roller shaft 40', and alined for intermittent operative engagement with a toothed sector 47 secured upon the shaft 7 that carries the cylinder 8.

During operation of the machine, the trough 35 is supplied with liquid through an opening 48, formed in one of its walls, and provided with a nipple 49 connected with a reservoir 50 by a flexible hose or tube 51. During operation of the machine the reservoir 50 is supported in inclined position above the level of the nipple 49 by a pair of rack arms 52 secured to the exterior of one of the side walls 2.

Figure 4:
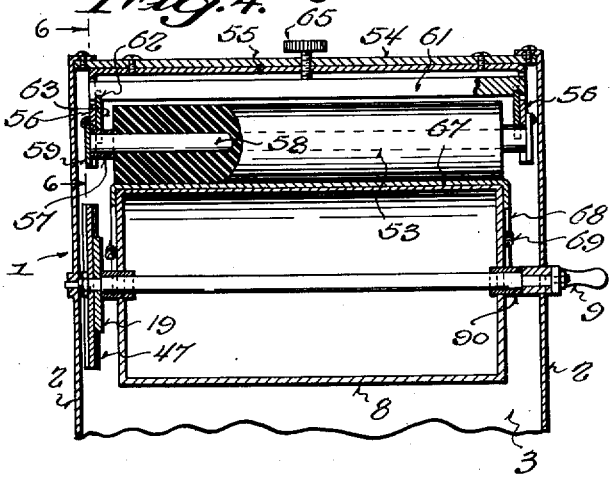
Figure 4 is a fragmentary transverse section taken on the line 4—4 of Figure 1.
Figure 6:
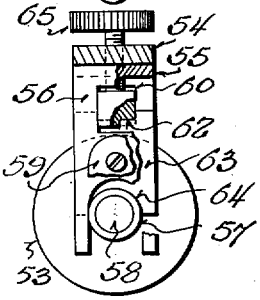
Figure 6 is a detailed section of the mounting of the pressure roll working against the master cylinder, the same being taken on the line 6—6 of Figure 4.

Mounted above the cylinder 8, closely adjacent the moistening mechanism 6, is a pressure roll 53 preferably formed of vulcanized rubber or composition, and engaging the cylinder to impress the work sheets tightly against the master copy carried by the cylinder. The pressure roll 53 is adjustably mounted on the casing as shown in Figures 4 and 6, which includes a transverse strap 54, fastened to the sides of the casing, and having attached thereto a bracket 55 provided at its ends for reception of sleeves 57 in which the roller shaft 58 is journaled. The shaft 58, and its sleeves 57 are held against longitudinal movement by abutment plates 59 fastened to the outer faces of the depending arms 56.

Slidably mounted within slots 60 provided in the arms 56, is a pressure bar 61 provided adjacent its ends with notches 62 for reception of the pressure plates 63, which are also notched at their upper ends to straddle the pressure bar 61, thus locking the bar 61 against longitudinal movement and preventing transverse shifting of the plates 63 with relation to the bar. The lower ends of the pressure plates 63 are provided with arcuate notches 64 for reception of the sleeves 57. A thumb screw 65 threaded through the strap 54 and the bracket 55 engages the pressure bar 61 intermediate its ends to provide for adjustment of the pressure exerted by the roller 53 upon the master cylinder 8, the pressure being equalized and transmitted to the ends of the roller by the plates 63.

Figure 8:
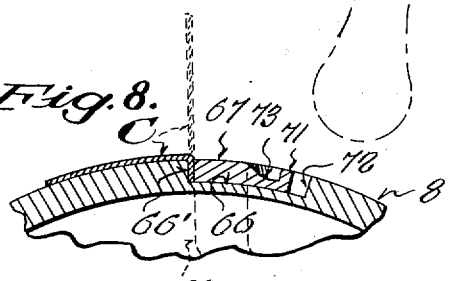
Figure 8 is a fragmentary detail section taken on the line 8—8 of Figure 2, illustrating the clamping mechanism for the master copy.

As best shown in Figures 1, 2, and 8, the cylinder 8, is provided with a transverse groove 66 for reception of a pinch bar 67 that serves to clamp an end of the master copy C upon the cylinder. The ends of the pinch bar terminate in depending arms 68, which abut the hubs 69 of the cylinder 8, as best shown in Figure 1, while contractile springs 70 connected to the sides of the cylinder 8 and the arms 68 serve to create both radial and circumferential tension upon the bar 67, to yieldably hold the same within the transverse groove 66 of the cylinder, and against the rear wall 66' of the groove, the end of the master sheet being clamped between the bar and rear wall of the groove.

To facilitate attachment of the master copy in the groove 66, the bar 67 is provided centrally of its ends with a tongue 71 that extends into a recess 72 formed in the periphery of the cylinder 8 and communicating with the groove 66. The tongue 72 is provided with a recess or opening 73 for reception of the operator's finger nail or a suitable tool to shift the bar 67 against the tension of the spring 70 and space the clamping face of the bar sufficiently from the side of the groove to allow the end of the master copy to be easily inserted.

Figure 9:
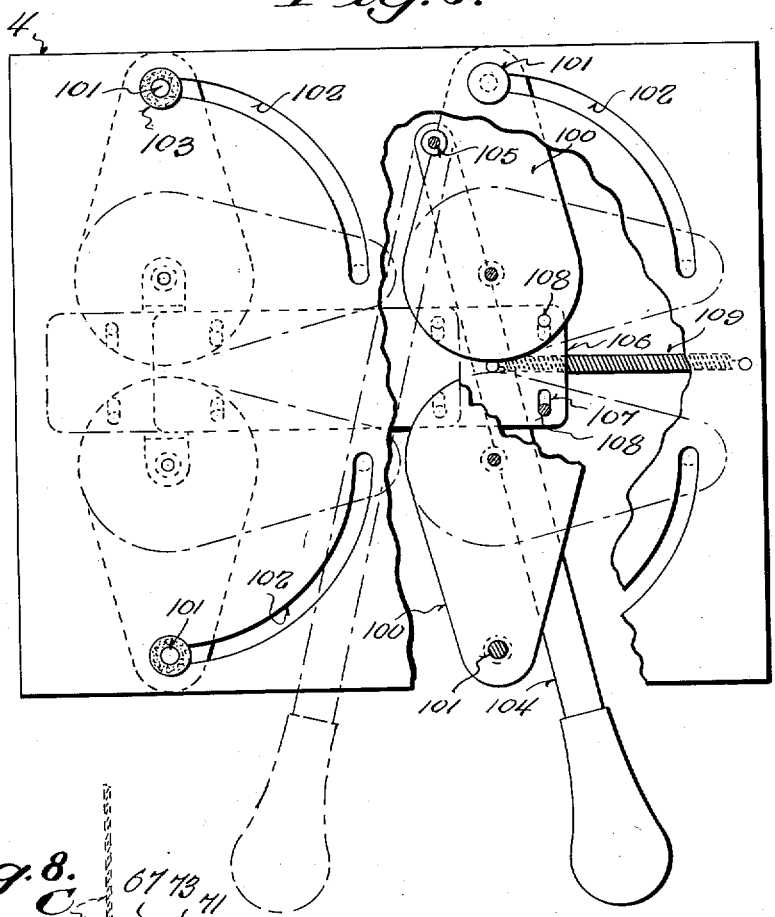
Figure 9 is a plan view of a stack supporting table equipped with a modified form of stack centering and holding mechanism, parts being broken away and in section to more clearly illustrate structural features.

Figure 9 illustrates a modified form of mechanism for centering and holding the work sheets on the supporting table, which eliminates worm screws and gears, such as employed in the mechanism heretofore described.

The modified centering mechanism consists of a plurality of oscillating levers 100 pivotally connected to the lower face of the table 4, and provided at their outer ends with studs 101, which project upwardly through arcuate slots 102 formed in the table. The forward pair of studs 101 are provided with sleeves 103 formed of soft sponge rubber or similar material for frictionally engaging the sides of the stack supported on the table, while the adjacent studs which are longitudinally alined with the sleeves, are preferably formed of hard smooth material, and serve to both longitudinally aline and guide the sheet from the stack during the feeding operation. As in the centering mechanism heretofore described rotation of the levers will contract and expand the studs with relation to each other, to compensate for varying length and width of work sheets.

Oscillation of the levers 100 is accomplished by means of a handle 104 pivotally connected to the under side of the table 4 at 105, and operatively connected to a sliding plate 106 provided with transverse slots 107 for reception of pins 108 carried by the levers 100. It will be apparent that upon oscillation of the handle 104, the plate 106 through its connection with the handle will be longitudinally shifted, and through the slot and pin connections with the levers 100, the latter will be oscillated on their pivots to contract or expand the holding and guiding pins 101 and 103, respectively. The contractile spring 109 connected to the plate 106 and the table 4, serves to normally urge the plate in one direction to expand the posts with relation to each other, while the handle may be locked in adjusted position in any conventional manner.

*Operation*

Figure 3:
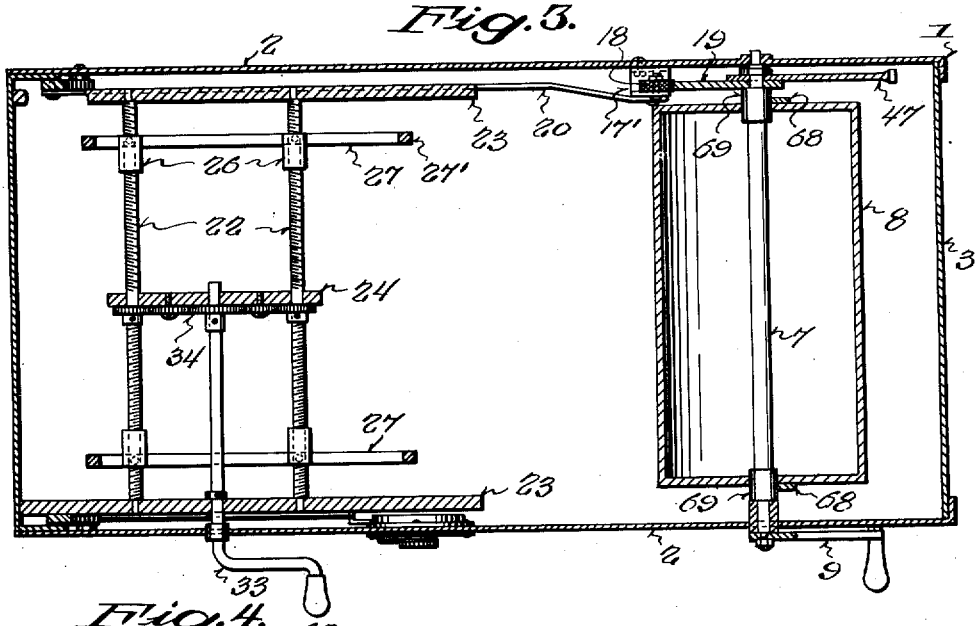
Figure 3 is a plan section taken on the line 3—3 of Figure 1.

In operation, the centering and holding mechanism 5, Figures 1 and 3, is adjusted to the approximate width of the work sheets to be used, by rotation of the crank handle 33, and the frictional pads are then longitudinally adjusted on the straps 29 to a point where they will engage the stack adjacent its rear end, when the same is positioned upon the table and feet 30', as indicated in dot and dash lines in Figure 2. The crank handle is then rotated to contract the pads for centering and frictional engagement with the sides of the stack, in which position one pair of arms 27' formed on the bars 27 also engage the sides of the stack to hold the same in longitudinal alinement, and also guide the work sheets as they are fed to the moistener 6.

After the master copy has been clamped upon the cylinder 8, as heretofore explained, and the reservoir 50 is positioned upon the rack arms 52, to supply liquid to the moistener trough 35, and the cylinder 8 is then rotated by means of the handle 9, during which operation the eccentric 19 mounted upon the cylinder shaft 7 effects oscillatory movement of the lever 17', which, through its link connection with the feed mechanism 14, causes the foot J, in contact with the top work sheet of the stack, to move toward the moistening mechanism. When the forward end of the sheet which is guided to the moistener by the throat T, engages the moistening roll 39 and the pressure feed roll 30, the same is held against further movement in as much as the operation of the moistener is so timed that during the initial sheet feeding operation, the rolls 39 and 40 remain stationary. Consequently, continued travel of the foot J merely causes the work sheet F to buckle or bow upwardly, as shown in heavy dot and dash lines in Figure 1. At this point, the sector 47 is timed to engage the fiber roller 46 mounted upon the shaft 40' of the pressure feed roll, to impart rotation to the same, which causes the sheet to be fed through the moistener, and to the cylinder 8 and pressure roll 53.

Inasmuch as a portion of the moistening roll 39 is submerged in the liquid contained in the trough 35, obviously, as the work sheets are fed over the moistener roll, moisture from its surface will be transferred to the lower face of the same, which engages the master copy on the cylinder 8.

During the moistening operation excessive liquid is removed from the surface of the moistening roll 39 by the squeegee roll 43, and in as much as neither the feed roll 40, nor the moistening roll 45 are rotated until such time as the work sheet is interposed between them, at no time is moisture transferred to the pressure feed roll 40, such as would occur in the interval between the intermittent sheet feed, were the rolls to be continuously driven. The importance in elimination of moisture from the feed roll 40 can be readily appreciated in that such moisture would be transferred to the back of the sheet, as well as to the face of the sheet, for a certain distance, creating a condition of excessive moisture in the sheet over that area, causing an extra heavy copy on the excessively moistened area, which is not only objectionable with respect to uniformity of the copy, but also results in rapid deterioration of the corresponding part of the master copy.

Due to the fact that the reservoir 50 is a closed receptacle, when the same is placed upon the arms 52 in operative position, atmospheric pressure maintains a constant level of liquid within the trough determined by the position of the inlet 48. When the reservoir is removed from the rack and placed upon a table or support, below the opening 48, the liquid contained in the trough quickly drains off and returns to the reservoir.

The drive roller 46 for the feed pressure roll 40 has been described as formed of fiber or composition material, while the driving sector 47 operatively connected with the cylinder 8 is provided with a serrated surface for timed operative engagement with the roller 46. This structure is preferred as compared to a gear and gear sector having conventional gear teeth, due to its low cost and he fact that no positive stop is provided for the feed pressure roll, which in some instances would result in disalinement of the teeth, and damage to the machine.

From the moistener the sheet is fed in timed relation to the cylinder 8, and because of the timing, accurate register between the work sheet and master copy is obtained. During rotation of the cylinder, the pressure roll 53 insures proper contact between the moistened work sheet and master copy to produce a clean and uniform impression, and due to the fact that the moisture is so accurately controlled, the condition of the work sheet following its impression is such that it moves away from the feeder to be engaged by the inclined delivery plate 10 at the rear end of the machine, which directs it to a stack of completed copies on an adjacent support.

From the foregoing explanation, considered in connection with the accompanying drawings, it will be seen that a comparatively simple and inexpensive duplicating machine of the liquid type has been provided, in which a stack of work sheets of varying dimensions is quickly centered and registered on the table for automatic feeding to a moistening mechanism of the roller type, designed to apply a uniform amount of moisture to the face of the work sheet throughout its length, without the aid of wicks, brushes or similar devices, which are uncertain in operation, and require frequent replacement. It will further be apparent that as the work sheets pass through the moistener wrinkling of the work sheets is precluded and consequently, the same will be delivered in smooth condition to the master copy, in accurate registration with the same. Attention is also directed to the fact that the structural design of the various elements produces an exceedingly inexpensive machine, and eliminates the necessity of a high degree of accuracy in machining and assembling of the operative parts.

It will further be apparent that the method and structure for feeding sheets from the stack, eliminates requirement of precise timing of the feed through the moistener, in that the buckling of the work sheet which occurs, compensates for minor inaccuracy in design or operation of the moistener feed.

The means provided for maintaining a constant level of liquid in the moistener during the operation of the machine, is exceedingly simple and efficient, and relieves necessity of manually draining liquid from the moistener trough when the machine is not in use.

While various means may be employed for attaching the master copy to the cylinder 8, the resilient clamp illustrated and described is simple and effective and permits removal and attachment of the master copy with minimum effort.

In conclusion the present machine provides automatic feeding of work sheets from a stack varying widely in dimensions and quickly centers and accurately registers on a supporting table by mechanical means, the stack being frictionally held and the sheets being accurately guided to insure accurate feed of a single sheet at a time to the moistening mechanism, which operates to uniformly apply a controlled amount of moisture to the entire face of the work sheets, which are maintained in smooth condition, insuring uniform impressions and a maximum number of copies from a single master.

I claim:

1. A rotary duplicator of the liquid type comprising, a moistening roll over which the sheets are fed, a pressure feed roll engaging said moistening roll, a continuously driven cylinder containing a master copy for receiving sheets from said pressure feed roll and moistening roll, means operatively connected with said cylinder for feeding sheets to the bight between said pressure feed and said moistening roll, and driving means for said pressure feed roll including a driving element operatively connected to rotate with said cylinder for intermittently engaging and rotating an element operatively associated with said pressure feed roll subsequent to engagement with the work sheets to cause buckling of the work sheet prior to rotation of said pressure roll.

2. A rotary duplicator of the liquid type comprising, a moistening roll over which the work sheets are fed, a pressure feed roll engaging said moistening roll and provided with oppositely extending threads to create transverse spreading tension upon said sheets as they are fed between said rolls, a continuously driven cylinder containing a master copy for receiving sheets from the moistening roll, means operatively connected with said cylinder for feeding sheets to the bight between said pressure feed roll and said moistening roll and driving means for said pressure feed roll including a driving element operatively connected to rotate with said cylinder for intermittently engaging and rotating an element operatively associated with said pressure feed roll.

3. The combination in a rotary duplicator of the liquid type of a rotatable cylinder carrying a master copy, means for rotating said cylinder, a sheet feed mechanism, a sheet moistening mechanism, driving means associated with said rotating cylinder and operative to effect continuous operation of said sheet feed mechanism to forward individual sheets from a stack to said sheet moistening mechanism, and driving means including an element rotatably associated with said rotating cylinder and operative to intermittently engage and rotate an element operatively associated with said moistening mechanism to initiate the operation of said moistening mechanism in timed relationship with the rotation of said cylinder whereby accurate registry is effected between the moistened sheet and the master copy carried by said cylinder.

4. The combination in a rotary duplicator of the liquid type of a rotatable cylinder carrying a master copy, means for rotating said cylinder, a sheet feed mechanism adapted to be continuously operated from said rotating cylinder, a sheet moistening mechanism adapted to be intermittently operated from said rotating cylinder, driving means associated with said cylinder for effecting the operation of said sheet feed mechanism, and driving means associated with said cylinder for effecting the intermittent operation of said moistening mechanism, said last named driving means including a driving element operatively connected to rotate with said cylinder and a driven element associated with said sheet moistening mechanism, said driving and driven elements cooperating to effect intermittent operation of said sheet moistening mechanism, said sheet feed mechanism being operative to forward individual sheets from a stack to said moistening mechanism and said moistening mechanism being intermittently operative to deliver a moistened sheet to said cylinder in accurate registry with the master copy carried by said cylinder.

5. The combination in a rotary duplicator of the liquid type of a rotatable cylinder carrying a master copy, means for rotating said cylinder, a sheet feed mechanism adapted to be continuously operated from said rotating cylinder, a sheet moistening mechanism adapted to be intermittently operated from said rotating cylinder, driving means associated with said cylinder for effecting the operation of said sheet feed mechanism and driving means associated with said cylinder for effecting the operation of said sheet moistening mechanism, said sheet feed mechanism being operative to forward individual sheets from a stack to said sheet moistening mechanism and said last named driving means including a driving element operatively connected to rotate with said cylinder and a driven element associated with said sheet moistening mechanism, said driving and driven elements cooperating to effect intermittent operation of said sheet moistening mechanism, said moistening mechanism being operative to interrupt the travel of the forward edge of the sheet to insure proper registry between the sheet and the master copy carried by said cylinder when motion is imparted to said sheet moistening mechanism.

6. The combination in a rotary duplicator of the liquid type of a rotatable cylinder carrying a master copy, means for rotating said cylinder, a sheet feed mechanism, and a sheet moistening mechanism, said sheet moistening mechanism including a moistening roller and a pressure feed roller arranged for frictional rotation in unison to effect the moistening of a sheet and the delivery of the same to said rotatable cylinder carrying the master copy, driving means operatively associated with said cylinder for effecting the continuous operation of said sheet feed mechanism, driving means operatively associated with said cylinder for effecting the intermittent operation of said sheet moistening mechanism, said last named driving means including an element arranged to rotate with said cylinder and having a driving surface thereon and a roller operatively connected with one of said sheet moistening mechanism rollers, said driving surface being arranged to intermittently engage and rotate said last named roller, said driving means for said sheet feed and moistening mechanisms both cooperating in a manner to effect delivery of a sheet to said moistening mechanism while the latter is at rest and said moistening mechanism being rendered operative to forward the moistened sheet to said cylinder in registry with the master copy carried thereon.

7. The combination in a rotary duplicator of the liquid type of a rotatable cylinder carrying a master copy, means for rotating said cylinder, a sheet feed mechanism adapted to be continuously operated from said rotating cylinder, a sheet moistening mechanism adapted to be intermittently operated from said rotating cylinder, said sheet moistening mechanism including a moistening roller and a pressure feed roller arranged to cooperate to frictionally engage and forward a sheet, driving means associated with said cylinder for effecting the continuous operation of said sheet feed mechanism, and another driving means associated with said cylinder for effecting the intermittent operation of said moistening mechanism, said last named driving means including an element arranged to rotate with said cylinder and having a driving surface thereon and a roller operatively connected with one of said sheet moistening mechanism rollers, said driving surface being arranged to intermittently engage and rotate said last named roller to drive said moistening mechanism, the rollers of said moistening mechanism forming a stop to interrupt the travel of the forward edge of a sheet to insure registry of the sheet when the moistening mechanism is rendered operative to deliver the sheet to the rotating cylinder carrying the master copy.

8. The combination in a rotary duplicator of the liquid type of a rotatable cylinder carrying a master copy, means for rotating said cylinder, a sheet feed mechanism adapted to be continuously operated from said rotating cylinder, a sheet moistening mechanism adapted to be intermittently operated from said rotating cylinder, said sheet moistening mechanism including a moistening roller and a pressure feed roller arranged to cooperate to frictionally engage and forward a sheet to said rotating cylinder, driving means associated with said cylinder for effecting the continuous operation of said sheet feed mechanism, and driving means associated with said cylinder for effecting the intermittent operation of said moistening mechanism, said last named driving means including an element arranged to rotate with said cylinder and having a driving surface thereon and a roller operatively connected with one of said sheet moistening mechanism rollers, said driving surface being arranged to intermittently engage and rotate said last named roller to drive said moistening mechanism, the rollers of said moistening roller and pressure feed roller being disposed in the path of travel of a sheet delivered from said sheet feed mechanism and forming an abutment by the line of contact between the surfaces of said rollers to interrupt the travel of the sheet in a manner to insure registry of the sheet with the master copy carried by said cylinder when said moistening mechanism is rendered operative to deliver the sheet to said rotating cylinder.

ROSCOE R. ROCKHILL.